Jan. 27, 1970 R. R. HEDRICK ET AL 3,491,903
INDUCTION SCHEME AND AUTOMATIC LOADER
Filed Nov. 21, 1967
2 Sheets-Sheet 1
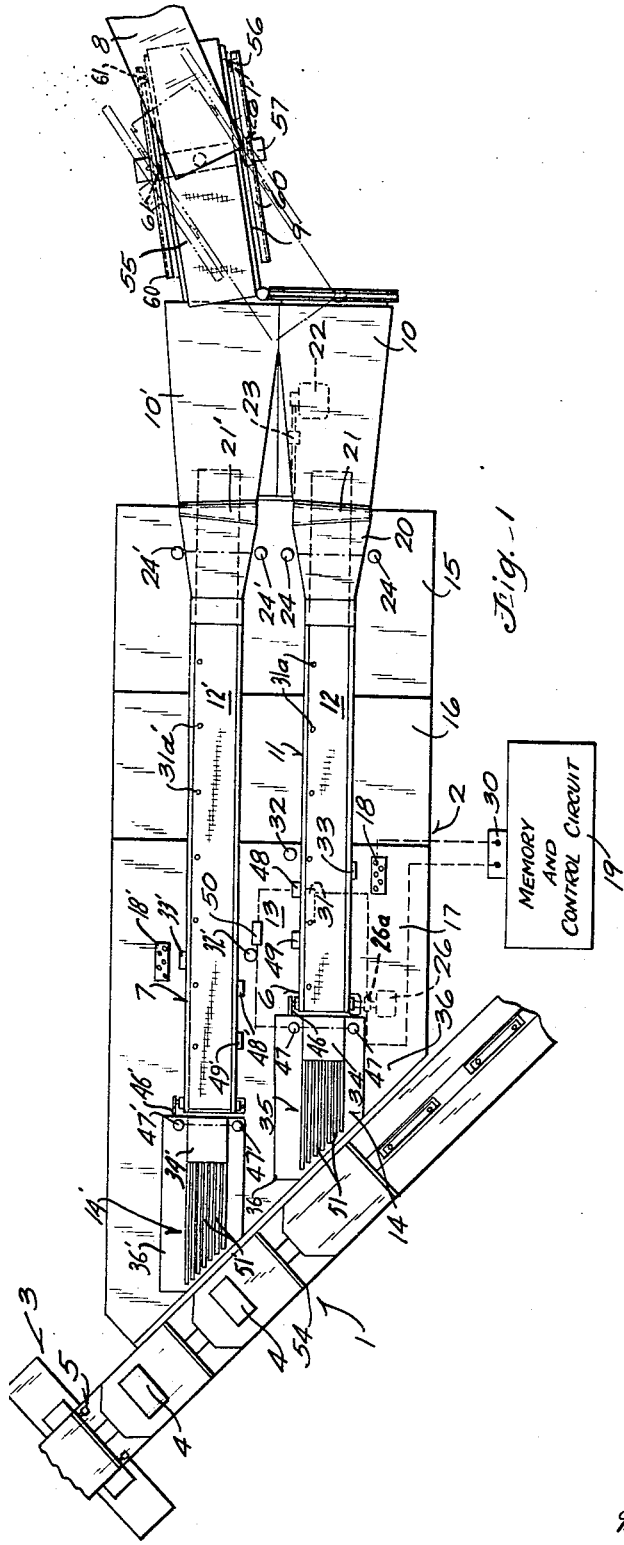
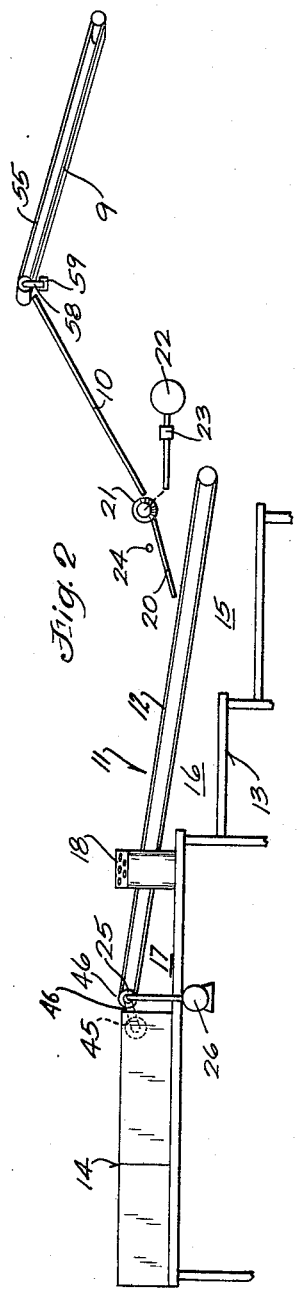
Inventors
Robert R. Hedrick
Arthur L. Thomas
By Andrus & Starke
Attorneys

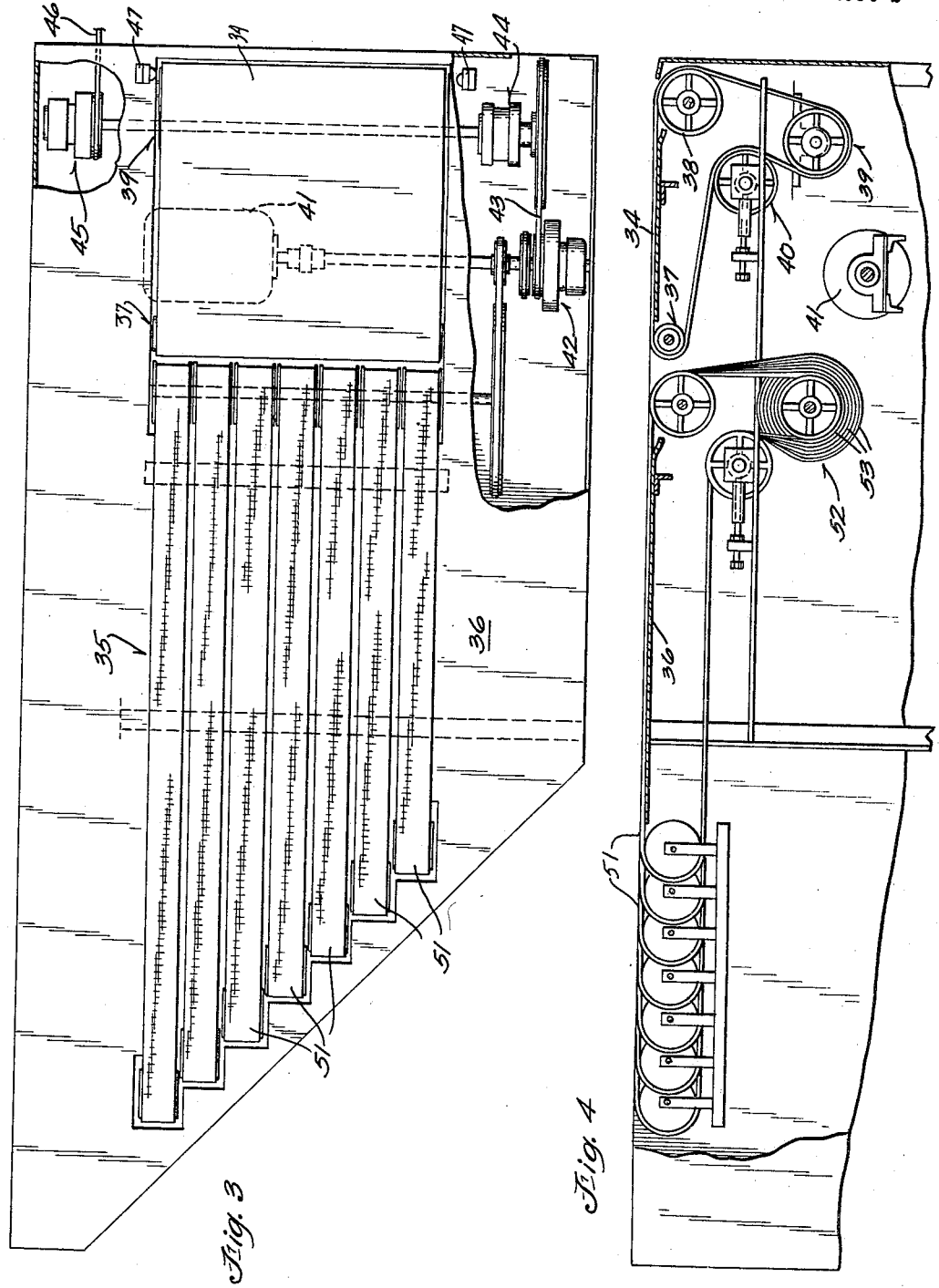

United States Patent Office 3,491,903
Patented Jan. 27, 1970

3,491,903
INDUCTION SCHEME AND AUTOMATIC LOADER
Robert R. Hedrick and Arthur L. Thomas, Milwaukee, Wis., assignors, by mesne assignments, to "Automatic" Sprinkler Corporation of America, Cleveland, Ohio, a corporation of Ohio
Filed Nov. 21, 1967, Ser. No. 686,385
Int. Cl. B65g 47/34, 47/20
U.S. Cl. 214—11
9 Claims

ABSTRACT OF THE DISCLOSURE

Induction or loading apparatus includes a pair of parallel induction lines mounted in side-by-side relation and extending at an angle from a main tilting tray sorter. The articles are fed from a single input conveyor belt for both lines to a swinging conveyor belt mounted above the top of loading chutes to the lines and selectively swung betwen the two chutes to continuously trannsfer articles into the pair of induction lines. The articles are moved through a separating and infeed conveyor belt which is operated in timed relationship to the sorter.

An intermediate transfer device bridges the gap between the infeed conveyor belt and the sorter and includes a first belt and a plurality of laterally spaced endless belts travelling longitudinally of the feed angle. The first belt operates at a slow speed to receive an article and at high speed to transfer it to the plurality of belts. The plurality of belts operates at relatively different speeds with the belt adjacent the leading end of the sorter being the greatest and the succeeding belts travelling at progressively slower speeds. The article on the transfer device rotates in the direction opposite to the movement of the sorter and onto the tray.

The keying operator keys the article for a tray of the sorter directly with its relationship on the infeed conveyor belt without concern for the actual transfer.

The energization of the system for driving the belts is interconnected to the movement of the sorter to automatically actuate them in accordance with the movement of the sorter and therefore in accordance with the tray which is related to a keyed article and to a selected unloading position.

This invention relates to an automatic loading or induction apparatus and particularly to the separation and transfer of a plurality of articles at a central receiving means to a conveyor and sorting apparatus for automatic separation of the articles into related groups at preselected unloading stations.

With the advent of large mechandising warehouses and mass distribution of items, automatic sorting systems have been developed. For example, U.S. Patent 3,034,655 to Richard L. Speaker discloses a particularly satisfactory high speed tilting tray sorting system. As more fully disclosed therein, the several items received at one or more central locations are separately carried on pivotally mounted platforms or trays forming a part of an endless conveyor. An input control unit at each loading station actuates a memory unit which in turn controls tilting mechanisms disposed at the loading stations. Such conveyor systems have been found to provide a means of high speed sorting. However, in order to utilize fully the capabilities of the conveyor, the loading means for delivering and placing of the products onto the successive trays must be operable at a related speed. Manual loading requires a substantial number of personnel because of the high speed movement capable with properly constructed conveyors of this type; for example, speeds of 400 feet per minute have recently been obtained with a tilting tray sorting system.

The present invention is particularly directed to an induction apparatus for automatic loading of a conveyor and the keying of the destination into a memory unit in a manner permitting utilization of maximum capability of the sorting system. The present system reduces the personnel requirements while permitting increased accuracy of input to the memory unit and thus increased accuracy of sorting.

Generally, in accordance with the present invention, the articles are moved through a synchronized separating and infeeding conveyor or transfer means which is operated in timed relationship to the conveyor unit or sorter. An intermediate transfer device or load accepts the articles from the infeed transfer means and automatically transfers the articles to the sorter in proper timed relation. The keying operator keys the article directly with its relationship on the infeeding conveyor or transfer means without concern for the actual transfer.

Generally, in accordance with a particularly novel feature of the present invention, the induction loader is constructed to move the articles into the sorter at an angle with respect to the path of the conveyor trays or receiving means and in the direction of movement of the trays. This transfer device or loader includes a first transfer means for properly positioning of the article with respect to a final transfer assembly. The final transfer assembly includes a plurality of laterally spaced conveying or transfer means such as endless belts travelling longitudinally of the feed angle. The plurality of belts operates at relatively different speeds with the belt adjacent the leading end of the sorter or conveyor being the greatest and the succeeding belts travelling at progressively slower speeds. The article on the final transfer assembly rotates relative to the movement of the sorter and onto the tray. In loading elongated articles onto the system, the long dimension is located in the direction of feed onto the final transfer assembly which then rotates the article to place the long dimension perpendicular to the tray. The angular feed onto the tray is at such a rate and direction to essentially simulate the stopping of a tray.

The energization of the system for driving the loading apparatus is interconnected or synchronized to the movement of the conveyor means of the sorter to automatically actuate the final transfer assembly in accordance with the movement of the conveyor means and therefore in accordance with the location of the conveyor means which has been related or keyed to an article and to a selected discharge or unloading position.

The loading apparatus preferably includes a plurality of parallel induction lines mounted in side-by-side relation and extending from the main conveyor. The articles are fed to a separate loading chute for each line. In accordance with another novel feature of the present invention, articles are fed from a single input conveyor for both lines to a swinging conveyor mounted above the top of the two loading chutes. The swinging conveyor is selectively swung between the two chutes to continuously transfer articles into the pair of induction lines.

The drawings furnished herewith illustrate preferred constructions of the present invention in which the above advantages and features are clearly disclosed as well as others which will be clear from the following description.

In the drawings:

FIG. 1 is a plan view showing the conveying or sorting apparatus and the induction loading apparatus constructed in accordance with the present invention;

FIG. 2 is a diagrammatic side elevational view of an induction loading apparatus shown in FIG. 1;

FIG. 3 is an enlarged plan view of the transfer assembly shown in FIGS. 1 and 2; and FIG. 4 is a side elevational view of FIG. 3.

Referring to the drawings and particularly to FIGS. 1 and 2, the illustrated embodiment of the invention includes a tilting tray conveyor system or sorter 1 moving continuously between an induction or loading station 2 and a plurality of receiving or unloading stations 3. The sorter 1 is generally of the type shown in the previously referred to United States Patent 3,034,665 to R. L. Speaker and includes a plurality of tray assemblies 4 pivotally connected to a chain drive unit for continuous movement about a loop between the stations 2 and 3. Tip-up assemblies 5 are pivoted at the unloading stations 3 for the selected tilting of the tray assemblies 4 to an unload or discharge position as the tray moves thereby. The tray assemblies 4 are initially loaded at the loading station 2 from a pair of similar induction or loading units 6 and 7, particularly forming the subject matter of the present invention, each of which sequentially transfers articles and deposits a single article to a tray assembly 4 from a common feed conveyor 8 such as an endless belt. A swing conveyor 9 takes the articles from conveyor 8 and deposits them in the induction units 6 and 7 to maintain continuity of loading to the rapidly moving sorter for subsequent sorting. In a warehouse for a large department store operation or any other operation or any other operation which requires the sorting of items, the ordered items may be arbitrarily placed on the infeed conveyor 8 and transferred into the induction units 6 and 7. During the movement through the induction units 6 and 7, each item or article is keyed to a particular unloading station 3 for the related order and automatically transferred to the proper tray assembly 4 for discharge when that tray assembly moves into alignment with the selecting unloading station 3.

Generally, each of the induction units 6 and 7 is similarly formed and consequently induction unit 6 will be described with corresponding elements of unit 7 similarly numbered.

The induction unit 6 includes an infeed chute 10 which takes items from the swing conveyor 9 and moves them in sequence onto an infeed conveyor 11. The latter unit 11 includes a synchronized endless belt 12 which moves upwardly on a floor or platform 13 and carries the items upwardly from the lower end of the chute 10 and deposits the items onto a tray loader 14. Immediately to the outer side of the conveyor 11 and particularly synchonized belt 12, various operating stations are provided on the platform 13 at which operating personnel are stationed. A metering station 15, located adjacent the discharge end of the chute or slide 10, has personnel placing a single package on each of the spaced portions or areas of the synchronized belt 12. The articles next move past an orienting station 16 located generally centrally of the conveyor 11 at which the articles are arranged for conveniently and rapidly reading a label or coded destination information. Adjacent the discharge end of the synchronized belt 12, a keying station 17 is provided at which keying personnel stands for operating a keyboard 18 which in turn is connected to a memory and control unit 19 for proper interrelated actuation of the sorter 1 and particularly the tip-up assemblies 5.

No particular detailed memory unit or the like is shown herein as such device may take any one of a number of different desired designs and the particular structure would unduly complicate the description, and is not believed necessary to an understanding of the present invention.

The movement of the synchronized belt 12, the tray loader 14 and the tray assemblies 4 are interconnected and interrelated such that actuating of the keyboard 18 at a particular time or period during which the belt 12 moves past the keying station 17 causes the item on that part of the belt 12 to be automatically transferred to a proper tray assembly 4 for discharge at a selected unloading station 3 by tipping of the tray assembly 4 when it is aligned with such unloading station.

More particularly, the inclined chute 10 extends downwardly from immediately below the swing conveyor 9 and terminates above the lower end of the belt 12. A relatively small slanted feed table 20 extends from the lower end of the chute 10 downwardly and terminates immediately above the upper portion of the synchronized belt 12. An indexing tapered roller 21 is mounted at the junction of the chute 10 and the table 20 to transfer articles to the table 20. The roller 21 is tapered with the small diameter end adjacent to the side of the metering operator. The indexing roller 21 is intermittently driven in a demand cycle by a motor 22 which is selectively coupled to the roller 21 through a clutch unit 23 in response to a photocell sensor unit 24 mounted adjacent the table to transfer the articles from the storage chute 10 to the table 20. The operator or metering person at that station transfers the articles, one at a time, onto proper divisions of the synchronized belt 12.

The synchronized belt 12 is a continuous belt member which is mounted on suitable support rollers and extends at a slight angle from beneath the chute 10 and transfer feed table 20 upwardly past the several operating stations. The upper support roller 25 is coupled to a drive motor 26 by an electrically controlled air clutch unit 26a, or the like, to rotate the belt 12 at a selected speed.

The belt 12 is marked in equilongitudinally spaced relation to define a plurality of article areas, each of which may be colored for identification purposes to assist in proper orientation and location of the articles. The article areas move continuously and in and endless manner from the metering station 15 to and past orienting station 16 and keying station 17 to the loader 14.

Personnel at the orienting station 16 rearrange the articles placed on the synchronized belt 12 at the metering station 15 and in a proper location within the areas for proper transfer by the loader and to expose proper identification to the individual at the keying station 17 to permit rapid and convenient keying of the item into the keyboard 18. Further, elongated articles are preferably located longitudinally of the belt 12 for placement laterally across a tray as hereinafter described.

The sorter drive for the tray assemblies 4 is interrelated to the overall operation of the system and particularly that of the synchronized belt 12. A cycle switch 30 forming a part of the memory unit 19 is periodically actuated in timed relation to the movement of the tray assemblies 4 past a given point in the loop and particularly as they approach the loading station 2. Switch 30 actuates the air clutch 26a to drive the belt 12 and to maintain such movement until a sensor 31 senses predetermined movement of the belt 12 and disengages clutch 26a. For example, sensor 31 may be a photoelectric device through which the belt passes, the belt having properly located light control areas such as apertures 31a to sequentially actuate the sensor 31.

Synchronization between the infeed synchronized conveyor belt 12 and the sorter tray assemblies 4 is achieved by allowing the belt 12 to operate at a speed slightly greater than the average speed required, and maintaining the proper register between article areas of belt 12 and the sorter tray assemblies 4 by engaging and disengaging the drive clutch 26a via the cycle switch 30 in the memory control and the sensor 31. The speed of motor drive 26 is preferably set such that the belt 12 appears to run continuously; i.e., without hesitating between clutch 26a operating cycles. An article on a particular article area of belt 12 moves from the keying position 17 onto the loader 14 and is discharged therefrom during the time that it takes for the related tray assembly 4 to move from the given position in the loop into alignment with the loader 14. As a result, the article is deposited on the proper tray assembly 4 by the operator at station 17 properly actuating the keyboard 18 when the article moves past the keying station 17.

The operator at station 17 actuates the keyboard 18 as the particular article moves past and preferably in response to a suitable visible and/or audible signal. An indicating means, shown as a lamp 32, is shown mounted to one side of the belt 12 immediately in front of the station 17 in the illustrated embodiment of the invention. The lamp 32 is controlled by a belt activated switch 33 and illuminated each time the support area of belt 12 is properly located to accept an input to the keyboard 18 for a particular tray assembly 4 such that the subsequent movement of the synchronized belt 12 and loader 14 transfers the article carried by the keyed area in very precise and controlled relationship to the proper tray assembly 4.

The upper end of the synchronized belt 12 terminates immediately overlying the top surface of the loader 14 with belt 12 slightly above a transfer belt 34 forming a part of the tray loader 14 adjacent the infeed conveyor 11, and adapted to transfer each article to a high-speed multiple belt discharge section 35 extending between the belt 34 and the sorter 1.

Referring particularly to FIGS. 3 and 4, the loader 14 includes a platform or top wall 36 with the transfer belt 34 supported for rotation about the wall by a forward roll assembly 37 and a somewhat larger diameter rear roll assembly 38. A drive assembly 39 is rotatably mounted beneath the top plane of the wall to frictionally engage the inner peripheral surface of the endless transfer belt 34. An adjusting roll assembly 40 is shown mounted beneath the top wall 36 and engages the outer surface of the transfer belt 34 for adjusting the belt tension.

The drive roll assembly 39 is coupled to a drive motor 41 which is also mounted beneath the top wall 36 within the understructure of the tray loader 14. The shaft of the motor 41 is journaled in suitable supports and terminates at the outer end adjacent one side of the loader in a pneumatically actuated clutch 42. A V-belt and pulley assembly 43 interconnect the output of the clutch 42 to the drive roller assembly 39 through an air brake unit 44 mounted on the outer end of the drive roller assembly 39. The clutch, when energized, drives the belt 34 at a high speed.

When the clutch 42 is de-energized and the brake unit 44 set, the belt 34 is held in a stopped position.

The belt 34 is further adapted to be driven at a relatively slow speed. A second air clutch 45 is connected to the opposite end of the drive roller assembly 39 and is connected through a V-belt and pulley assembly 46 to the drive motor 26 which drives the synchronized belt 12. The movement of the transfer belt 34 and the belt 12 are thereby synchronized at a relatively slow speed during a transfer from belt 12 to belt 34.

A photocell control unit 47 is mounted to scan the belt 12 immediately adjacent the discharge end thereof. The photocell unit 47 is interconnected to actuate the clutch 45 whenever an article is in the beam of photocell unit 47 and establishes movement of belt 34 with the feeding of an article from belt 12 to belt 34.

The high speed cycle of belt 34 is controlled by two limit switches 48 and 49 mounted to be actuated by the infeed belt 12. When limit switch 48 closes, clutch 42 is engaged and the belt 34 rapidly rotated to transfer a package to the belt discharge section 35. The limit switch 49 opens the circuit and de-energizes the clutch 42. As the belt 12 is synchronized with the movement of the trays 4, the high speed actuation of belt 34 through the actuation of switches 48 and 49 by belt 12 provides the desired timed transfer by proper location of the switches. The high speed drive control is connected to override the low speed drive control established by the photocell unit 47 to insure proper transfer of articles to the sorter 1.

When neither the low or high speed drive switches are actuated, the air operated brake unit 44 is "set" to stop the belt 34. This breaking action is used to hold back packages that arrive at the loader 14 too early for proper transfer to a tray 4.

Normal operation for brake unit 44 is to stop the transfer belt 34 from slow speed, as the article is moved onto the loader 14. If no articles are being loaded, the brake unit 44 would have to stop the belt 34 from high speed since the low speed drive will not have been engaged. This would require an abnormally high brake rating. The loader control includes a resetting timer 50 operated by the same photocell unit 47 that controls the high speed drive to permit use of a brake with a smaller rating. Timer 50 prevents the high speed drive from operating if no articles are present for a preset period of time. As soon as another article is present, the loader 14 will resume normal cycle with the article deposited upon the belt 34 with the latter moving at a slow speed and subsequently moved onto the belt section 35 at a high speed.

The belt section 35 includes a plurality of constant speed loading belts 51 which extend between the immediate discharge end of the transfer belt 34 and the common side of the sorter and loading units 6 and 7, with the latter extending at an angle to the path of the tray assemblies 4.

In the illustrated embodiment of the invention, there are several laterally spaced belts 51 spanning the complete width of the transfer belt 34. The length of the belts 51 is successively shortened from the trailing end of the loading units 6 and 7 to the leading end to span the distance between the transfer belt 34 and the sorter.

The belts 51 run across the top of the wall 36 and extend downwardly through suitable openings therein. The belts 51 are separately supported on roller assemblies similar to the support of the belt 34 with a common drive shaft assembly 52 to which the several drive pulley sheaves or rolls 53 for the belts are secured.

The diameters of the rolls 53 progressively increase for the the successive belts 51 from the lower or trailing end to the upper or leading end relative to the movement of the conveyor unit. As a result, each smaller belt 51 rotates at a somewhat slower speed than the next or adjacent relatively longer belt. Consequently, when the article is disposed on the belts 51, it is moved rapidly forwardly toward the tray assemblies 4 with a simultaneous rotating movement or turning of the article at a relatively slow rate and in the illustrated embodiment in a counterclockwise direction such that the article rotates onto the proper tray assembly 4.

The illustrated automatic loader 14 thus sequentially receives the articles from the synchronized conveyor belt 12 one at a time, holds each article as required until the correct time for loading and then accelerates the article onto the tray assembly 4 at the same time turning it so its long dimension is approximately perpendicular to the movement of the tray. The article may of course be rotated in either direction depending upon the particular conveyor unit to which the articles are deposited.

The speed of the article moving onto the tray assembly 4 is such that it is moving with the tray assembly as it is being loaded with a result almost as if the sorter were stopped and the articles were loaded at right angles to the tray edge. The timing is selected so that each article in accordance with another novel feature enters the proper tray assembly 4 at the forward corner and drifts back, coming to rest near a rear lip 54 of the tray assembly 4.

This has been found to provide a very reliable and satisfactory means for high speed disposing of the articles onto the tray structure without danger of having the item move completely off the tray structure.

Referring particularly to FIGS. 1 and 2, the swing conveyor 9 in a simplified illustration includes an inclined endless belt 55 extending upwardly from just below the common feed conveyor 8 to above the chutes 10. The swing conveyor belt 55 is mounted on a frame structure 56 which in turn is attached to an encircling rotatable support 57 which perimts the belt 55 to be pivoted about a vertical axis for selective alignment with the two chutes 10. The forward end of the frame structure includes a depending guide 58 riding in a channel 59 adjacent the chutes and causing the belt 55 to move across the chutes in response to turning a support. The frame structure 56 is slidably mounted to the support 57 by a pair of support channels 60 on opposite sides thereof which mate with support rollers 61 on the adjacent side frames of the support assembly. In the one position of the swing conveyor 9, shown in phantom, the belt 55 is aligned with the chute 10 and extends generally forwardly from immediately below the conveyor 8 with the upper end overlying the one chute 10. In the alternate full line position, the swing conveyor 9 extends forwardly and terminates immediately above the opposite chute 10'.

The present invention permits automatic loading of high speed conveyor units and accurate keying or controlling of the subsequent operation of the conveyor for delivery of the articles to a desired location.

What is claimed is:

1. A loader assembly for transferring of articles received in random order to a conveyor means moving in a predetermined order, comprising, a conveyor means, a final transfer unit including means for simultaneously moving the articles laterally onto the conveyor means and simultaneously establishing a turning action on the article in the direction opposite to the movement of the conveyor means past the loading station, a belt means extending rearwardly from the transfer unit and having a plurality of equally spaced loading areas, a metering station immediately adjacent to the lower end of the belt means to permit placement of items into a loading area, a keying station following the metering station and including an input means for actuating the conveyor means in accordance with a keyed input, signalling means mounted adjacent to the belt means and operated by said belt means in accordance with the successive positioning of the loading areas to provide a signal for proper keying of the loading areas to the conveyor means, said final transfer unit includes a transfer belt extending from immediately below the adjacent end of the belt means forwardly a partial distance toward the conveyor means, a plurality of final transfer belts extending from the transfer belt to the conveyor and adapted to receive the articles from the transfer belt for movement onto the conveyor means, said final transfer belts being constructed to simultaneously move the articles into the path of the conveyor means and to exert a rotating turning movement on the article in the direction opposite to the travel of the conveyor means, and means to actuate said conveying means and said final transfer unit in timed relation to the conveyor means.

2. The loader assembly of claim 1 having means for driving said transfer belt at a high speed to move the article to the conveyor means and a low speed to receive an article from the conveying means and including means to hold the belt in a stopped position.

3. A loader assembly for transferring of articles received in random order at a loading means to a conveyor unit in a predetermined and selected order comprising a conveyor unit; a synchronized conveying means extending from a loading means, means to move said synchronized conveying means in accordance with the movement of the conveyor unit, said synchronized conveying means having a plurality of equally spaced portions to define a plurality of similar loading areas, a metering station immediately adjacent to the infeed end of the conveying means to permit placement of articles into a loading area, a keying means next to the metering station and including an input means for keying and actuating a portion of the conveyor unit in accordance with a keyed input, signalling means mounted adjacent to the synchronized conveying means, means on said synchronized conveying means to operate said signalling means in accordance with the successive positioning of the areas to provide a signal for proper keying of the areas, and an automatic transfer assembly extending from the discharge end of the synchronized conveying means to the conveyor unit and including means to automatically transfer keyed articles from said conveying means while simultaneously rotating the articles about a vertical axis to the related keyed portion of the conveyor unit.

4. The loader assembly of claim 3 wherein said automatic transfer assembly includes a first transfer means extending from the synchronized conveying means forwardly a partial distance toward the discharge end of the loader assembly, a plurality of final transfer means extending from the first transfer means to the conveyor unit and adapted to receive the item from the first transfer means for final transfer onto the conveyor, said final transfer means being constructed to simultaneously move the items into the path of the conveyor and to exert a rotating turning movement on the item in the direction perpendicular to the travel of the conveyor.

5. The loader assembly of claim 4 wherein said conveying unit moves in a path past the transfer assembly at a selected angle and said final transfer means is a plurality of laterally spaced similar belts extending forwardly from the first transfer means in accordance with the distance essentially between the first transfer means and the angularly related conveyor unit, a common drive shaft for said belts including a plurality of different diameter pulley sheaths coupled to the corresponding belts to drive the smaller belts at a lesser speed than all of the related longer belts whereby the article is moved longitudinally toward the conveyor and simultaneously rotated in the direction opposite to that of the conveyor movement.

6. The loader assembly of claim 4 wherein said conveyor unit moves in a path past the transfer assembly at a selected angle and said final transfer means including a plurality of laterally spaced similar belts extending forwardly from the first transfer means in accordance with the distance essentially between the first transfer means and the angularly related conveyor unit, and means to simultaneously and continuously rotate said final transfer belts with the speed of the belts increasing progressively from the leading end of the loader assembly relative to the conveyor unit.

7. The mechanism of claim 3 having a drive motor and a clutch coupling said drive motor to the first transfer means for driving said transfer means at said high speed in response to actuation of the clutch mechanism; a brake connected to the drive for the transfer means for holding said means in the stop position, a second clutch coupling the transfer belt to the synchronized conveying means for driving of the transfer means at a slow speed related to the movement of the conveyor, photoelectric means mounted adjacent the discharge end of the synchronized conveying means and controlling said second clutch, and switch means actuated by selected movement of the synchronized conveying means to actuate said first clutch and said brake to provide precise timed movement of the transfer means and the synchronized conveying means in accordance with the movement of preselected portions of the conveyor.

8. In combination, the loader assembly of claim 3, having a feed chute terminating in a metering roll, a loading table extending downwardly from the metering roll, photoelectric means spanning the loading table for controlling operation of the metering roller to sequentially supply articles from the chute to the loading table, a second loader assembly duplicating said first loader assembly and mounted in side-by-side relation thereto, a common infeed conveyor mechanism terminating adjacent and in spaced relation to the pair of chutes forming the parts of the said two loader assemblies, a swinging conveyor mounted between said infeed conveyor and said chutes and adapted to be swung with a portion maintained in alignment with the infeed conveyor and with the discharge end selectively overlying either one of said two chutes, for delivering articles to the two chutes to maintain continuous supply of items for transfer through said loader assemblies to said conveyor unit.

9. The loader assembly of claim 3 wherein said keying means includes means for assigning destination codes to the articles carried by said conveying means and to an unloading station related to a particular portion of the conveyor unit to which said article will be delivered as a result of the continued operation of the conveyor unit and the loader assembly.

References Cited

UNITED STATES PATENTS

| | | | |
|---|---|---|---|
| 1,192,832 | 7/1916 | Sherman. | |
| 2,717,086 | 9/1955 | Bush | 214—11 |
| 3,034,665 | 5/1962 | Speaker | 214—11 |
| 3,047,123 | 7/1962 | McKay. | |
| 3,063,542 | 11/1962 | Boller. | |
| 3,096,871 | 7/1963 | Anderson | 198—34 |
| 3,105,601 | 10/1963 | Small | 214—11 |
| 3,245,557 | 4/1966 | Maramante et al. | 214—6 |
| 3,321,062 | 5/1967 | Brockmuller et al. | |
| 3,397,800 | 8/1968 | Shaw | 214—11 |

FOREIGN PATENTS 1,028,032  1/1957  Germany.

GERALD M. FORLENZA, Primary Examiner

RAYMOND B. JOHNSON, Assistant Examiner

U.S. Cl. X.R.

198—33